US012587281B2

(12) United States Patent
Mokhtari-Koushyar et al.

(10) Patent No.: US 12,587,281 B2
(45) Date of Patent: Mar. 24, 2026

(54) PHASE STABLE SIGNAL GENERATOR AND SIGNAL DISTRIBUTION SYSTEM

(71) Applicant: ORCA Computing Limited, London (GB)

(72) Inventors: Farzad Mokhtari-Koushyar, Austin, TX (US); Thien-An Nguyen, Austin, TX (US)

(73) Assignee: ORCA Computing Limited, London (GB)

( * ) Notice: Subject to any disclaimer, the term of this patent is extended or adjusted under 35 U.S.C. 154(b) by 268 days.

(21) Appl. No.: 18/234,304

(22) Filed: Aug. 15, 2023

(65) Prior Publication Data

US 2024/0063913 A1 Feb. 22, 2024

Related U.S. Application Data

(60) Provisional application No. 63/398,391, filed on Aug. 16, 2022.

(51) Int. Cl.
*H04B 10/50* (2013.01)
*H04B 10/40* (2013.01)
*H04B 10/508* (2013.01)

(52) U.S. Cl.
CPC ......... *H04B 10/503* (2013.01); *H04B 10/508* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 5,101,450 | A | * | 3/1992 | Olshansky .......... H04J 14/0298 |
| | | | | 385/40 |
| 2010/0054288 | A1* | | 3/2010 | He ..................... G02B 6/29353 |
| | | | | 372/29.016 |
| 2014/0009763 | A1* | | 1/2014 | Bao ........................ G01N 21/55 |
| | | | | 372/20 |
| 2014/0029012 | A1* | | 1/2014 | Ogawa ............... G01N 21/4795 |
| | | | | 356/477 |

(Continued)

FOREIGN PATENT DOCUMENTS

| | | |
|---|---|---|
| CN | 111107329 A | 5/2020 |
| CN | 114640016 A | 6/2022 |

(Continued)

OTHER PUBLICATIONS

PCT International Search Report and Written Opinion, PCT Application No. PCT/US2023/30284, Dec. 12, 2023, 10 pages.

*Primary Examiner* — Darren E Wolf
(74) *Attorney, Agent, or Firm* — Fenwick & West LLP

(57) ABSTRACT

A signal generator provides a periodic optical signal as output. The signal generator can be optically coupled to a splitter or other distribution network that transits the optical signal along multiple paths to terminate at different locations and/or for use by multiple electronic circuits. Each path can include a reflector element that reflects a portion of the signal back along the optical signal path. Reflections can be separated by operation of a circulator and photodiode. Output of the photodiode can be used to adjust phase and/or amplitude of optical signals traversing each optical signal path such that each electronic circuit receives an in-phase reference signal as input.

17 Claims, 11 Drawing Sheets

(56)            References Cited

U.S. PATENT DOCUMENTS

| | | | | |
|---|---|---|---|---|
| 2015/0188287 A1* | 7/2015 | Mutalik | ............. | H04B 10/2931 |
| | | | | 359/334 |
| 2019/0013862 A1* | 1/2019 | He | ....................... | H04B 10/071 |
| 2020/0011994 A1 | 1/2020 | Thorpe et al. | | |
| 2020/0072703 A1* | 3/2020 | Roux | ................. | G01M 11/3145 |
| 2020/0192179 A1 | 6/2020 | Hajimiri | | |

FOREIGN PATENT DOCUMENTS

| | | | |
|---|---|---|---|
| DE | 102019211125 B3 | 11/2020 | |
| WO | WO 2021/098975 A1 | 5/2021 | |

\* cited by examiner

100

102

104

CTRL

106

OUT

600

700

PHASE STABLE SIGNAL GENERATOR AND SIGNAL DISTRIBUTION SYSTEM

CROSS-REFERENCE TO RELATED APPLICATION(S)

This application is a nonprovisional of, and claims the benefit under 35 U.S.C. 119(e) to U.S. Provisional Patent Application No. 63/398,391, filed Aug. 16, 2022, and entitled "Optical Clock Distribution System and Method Thereof," the contents of which are incorporated herein by reference as if fully disclosed herein.

TECHNICAL FIELD

Embodiments described herein relate to periodic signal generators and, in particular, to optical circuits and systems configured to provide a phase stable periodic signal source that may be used, for example, as input to electronic wireless communications systems and warfare systems.

BACKGROUND

Signal generators are used in many applications to produce reference signals, carrier signals, and clock signals. Many conventional electronic signal generators leverage frequency multiplication techniques or other harmonic generation techniques that exhibit undesirable phase and frequency instability noise in many bands, especially high frequency bands.

In addition, conventional electronic signal generators are typically performance-limited (and/or bandwidth-limited) by one or more properties of the electronic components from which they are made. As a result, high-performance, low phase-noise electronic signal generators—especially those producing signals within the microwave band or higher frequencies—are typically expensive, heavy, large, benchtop devices that are not suitable for portable or compact applications.

Further, many conventional circuits and systems require similar or identical reference signals and, in some topologies, a single conventional electrical reference signal may be split along multiple paths. This conventional technique, however, is lossy and inefficient requiring significant electrical power to overcome.

SUMMARY

Embodiments described herein take the form of a signal generator and signal distribution system, which may be collectively referred to as a distributed signal generator. Although not expressly required, many implementations of embodiments described herein can be leveraged to generate microwave signals with a center frequency falling between approximately 300 MHz and 300 GHz. In other cases, a signal generator as described herein can operate in different bands, such as radio frequency bands lower than microwave bands, or high frequency bands such as millimeter and terahertz bands.

A distributed signal generator, in some embodiments, includes a controller operably coupled to a periodic signal source. An example signal source may be a photonic integrated circuit configured to provide a stable soliton pulse train as output, which may be received as optical input to one or more high-speed photodiodes, which may be integrated or discrete. Output of the photodiode can be filtered with a band pass filter (or an appropriate sequence of overlapping low pass and high pass filters), and thereafter used as a clock signal, a reference signal, a modulation signal (a carrier) or any other signal. In other embodiments, a periodic signal can be generated in other ways, for example by laser mixing and/or from an external signal source.

In some cases, a signal generator as described herein can include an optical splitter interposing the photonic integrated circuit and the photodiode. In these constructions, multiple photodiodes can be positioned at optical outputs of each respective branch of the optical splitter. In this manner, a single soliton pulse train can be used to illuminate multiple photodiodes simultaneously (and in phase, presuming appropriate waveguide path length through the optical splitter), thereby inducing multiple in-phase electrical signals. This ultra-low phase noise distributed signal architecture may be particularly useful for multichannel wired or wireless communication systems, such as those implementing beamforming.

The photonic integrated circuit of a signal generator as described herein can include a laser light source configured to output narrow line width laser light at a particular center frequency. The laser light source may be a distributed feedback laser, although other example laser diodes or semiconductor stacks are possible. The laser light source is optically coupled via a photonic wire bond, a tapered waveguide, a lens array, or any other suitable optical coupling to a first waveguide, which can be formed from a material such as silicon nitride. As a result of this construction, laser light output from the laser light source is confined within the first waveguide.

A wavelength locking resonator, such as a ring resonator (which may be integrated into the photonic integrated circuit or may be a discrete component; examples of the resonator are ring resonators, Fabry-Perot resonators, whispering gallery mode resonators, and so on), can be positioned adjacent to the first waveguide. As a result of this construction, a portion of light confined by the first waveguide couples into the wavelength locking resonator. Light confined by, and resonating within/traversing through, the wavelength locking resonator thereafter interacts with and interferes with light within the first waveguide. In this manner, the line width of light confined by the first waveguide may be further narrowed by interaction with the wavelength locking resonator.

After linewidth narrowing by the wavelength locking resonator (and/or another component such as a Bragg grating or filter), light confined by the first waveguide can optionally couple into one or more active or passive photonic tuning elements, such as a Mach-Zehner Interferometer (MZI) structure or acousto-optic modulators or electro absorptive modulators, that can be used by a controller of the signal generator to further tune amplitude, phase, and/or frequency of linewidth-narrowed light confined by the first waveguide. In some cases, active or passive photonic tuning elements may not be required. In other cases, multiple active or passive photonic tuning elements may be used each imparting a different tuning effect.

An optical resonator with a high quality factor (thousands, millions, billions or greater quality factor; herein a "high-Q" resonator), which may be a multimode or single mode resonator, is positioned adjacent to the first waveguide farther down path of the wavelength locking resonator and/or any photonic tuning elements. Output of the wavelength locking resonator (and/or any photonic tuning elements) confined by the first waveguide can optically couple at least a portion of its confined light into the high-Q resonator. Light confined within, and moving through, the high-Q resonator can thereafter couple (via any suitable optical coupling) back into the first waveguide and/or interact with, and/or interfere with, linewidth-narrowed light confined by the first waveguide.

As a result of the resonant operation of the high-Q resonator, a soliton pulse train is introduced into the first waveguide. In other cases, the soliton pulse train may be introduced into a different waveguide from the first waveguide, although this is not required of all embodiments.

The soliton pulse train, confined by the first waveguide (or another waveguide, which may convey the soliton pulse train from the resonator to another optical circuit) after interacting with the high-Q resonator, can be thereafter optically coupled into a second filtering resonator that serves to further extract any residual source spectral content, further refining the spectral content of each soliton of the soliton pulse train.

The refined soliton pulse train is thereafter optically coupled (e.g., via an integrated waveguide, an optical fiber, or any suitable combination thereof) into a splitter or optical distribution network. A splitter may be a passive photonic circuit configured to divide optical power of the soliton pulse train across multiple paths. An optical distribution network may be a set of waveguides including one or more path-selecting optical switches (e.g., MZIs or similar photonic structure). In these examples, each path can be respectively coupled to a high speed photodiode, which, when excited by a soliton of the soliton pulse train, generates as output a low phase noise sinusoidal wave.

Many embodiments are implemented with a construction in which the various paths as output of the splitter are calibrated to maintain phase synchronization. These operations can be referred to as "self-calibration" operations or autocalibration operations. In some embodiments, a self-calibration operation includes a step in which path length differences are reduced or eliminated by additional selectively-controlled path specific phase delays and/or amplitude adjustments.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
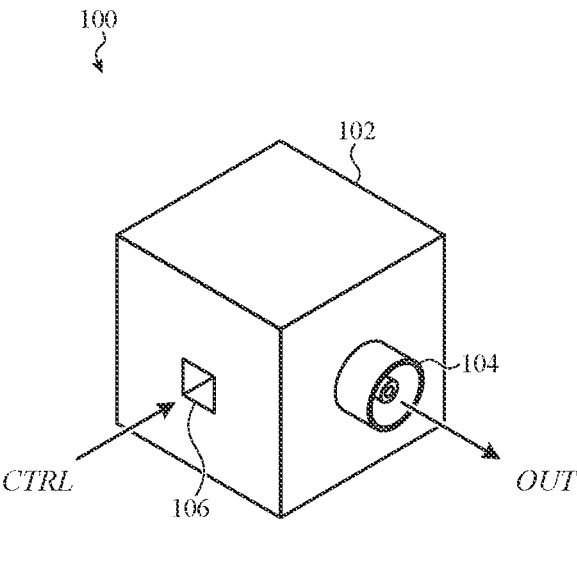
FIG. 1 depicts a signal generator adopting a small form-factor, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to small form-factor optical signal generators with a capability to output optical signals that are frequency stable and that exhibit exceptionally low phase noise, and that may be tuned to output any suitable frequency, whether that output frequency is significantly higher or significantly lower than internal clock signals or reference signals.

These generated signals can be distributed along multiple paths and thereafter converted (e.g., by a photodiode) to electrical signals to be used as clocks, carrier signals, reference signals, or for any other suitable purpose by two or more respective circuits. In many embodiments, different distribution paths of the same generated optical signal can have different path length or other differences that impart different phase delays at terminations of those different paths. To account for the phase delay associated with each respective path, configurable delay elements may be used in respect of each path to synchronize the phase of the optical signal across all branches of the distributed signal. In this manner, when each respective signal is converted from the optical domain to the electrical domain (and thereafter used as a local oscillator, a clock signal or other input), the resulting electrical signals may be as close to in-phase as possible. More simply, embodiments described here reference methods for reducing phase error between different branches of a distributed reference signal.

Some embodiments described herein include a periodic signal source configured to output a sinusoidal signal with exceptionally low phase noise and frequency stability as compared against conventional electrical signal generators which typically exhibit frequency-dependent phase noise or frequency instability or optical signal generators which typically command a large form factor and are not suitable for many use cases.

Some signal generators described herein mix two laser light sources. A difference in frequency between these sources results in a beat frequency that, in turn, can be leveraged as a lower-frequency periodic signal source. In other cases, an external reference signal can be provided as input to an optical modulator to generate an electro-optical phase loop lock. The modulator can be a lithium niobate Mach-Zehnder modulator or any other modulator, whether integrated or discrete. In some embodiments, the modulator can be configured in carrier suppression (CS), single side-band-carrier suppression (SSB-CS) configuration or any other configuration to provide frequency tuning.

In further embodiments, some signal generators as described herein leverage a laser-energized photonic integrated circuit configured to output a well-defined, stable, soliton pulse train. This, as known to a person of skill in the art, is a periodic time domain signal defined, in the frequency domain, by a set of evenly spaced frequency components. This characteristic frequency domain representation of a soliton pulse train is typically referred to as an optical comb. The tines of the comb are spaced at frequency steps corresponding to the time between soliton pulses. These precisely-spaced and precisely-shaped pulses of light can be leveraged to excite a high speed photodiode having an appropriately-selected time constant and a spectral sensitivity including the center frequency of the laser output. This high speed photodiode outputs a frequency-stable sinusoidal wave also referred to as a "tone" in response to illumination by the pulse train. In many examples, the tone may be in or above terahertz frequency band or in microwave band frequencies. Thereafter, the tone may be down-sampled or otherwise down-converted to lower frequencies, such as within the microwave frequency band (e.g., 300 MHz to 300 GHz).

In these constructions, the phase-stable and frequency-stable high-frequency signal output by the signal generator can be down-converted to any suitable lower frequency while preserving or improving phase stability and frequency stability. In a more simple and non-limiting phrasing, conventional high-frequency clock signals and carrier signals are generated by frequency multiplication which compounds phase error and drift. Conventional systems leverage an electronic periodic signal source, such as a crystal oscillator, and multiply that frequency to a suitable high frequency. By contrast signal generators described herein generate extremely precise signals at very high frequencies (e.g., optical frequency domains, within the terahertz band), and reduce to a suitable frequency. In conventional systems, phase error and drift are multiplied whereas for embodiments described herein, down-conversion can actually reduce phase error and drift.

Furthermore, although not required, in many embodiments, a signal generator and signal distribution network (self-calibrating) as described herein can be implemented in small form-factor, and efficiently manufactured in a cost-effective manner. For example, many embodiments can be disposed within a housing or other enclosure occupying less than 10 cubic centimeters.

As a result of the small form-factor, embodiments described herein can be incorporated into a number of applications unsuitable for conventional signal generators such as, but not limited to: satellite applications; compact sensors; high-bandwidth/high-performance wireless communications devices; spectroscopic sensors and applications; warfare systems; metrology systems; radar systems; LIDAR systems; continuous wave radar/LIDAR systems (e.g., frequency-modulated continuous wave systems); ranging systems; time-of-flight systems; geolocation systems; supercomputing applications; computing applications; personal and/or industrial electronic devices; and/or any other suitable computing device, computing network, or computing resource.

As noted above, a signal generator as described herein can be configured to output any suitable periodic waveform with any suitable center frequency or shape. As such, for sim

6 plicity of description, the embodiments that follow reference an implementation in which a signal generator as described herein is a signal generator configured to output a sinusoidal wave within the microwave frequency band (or mmWave or terahertz) typically leveraged as carrier frequencies for standards-compliant wireless communications systems (e.g., 5G NR, 6G, Wi-Fi 6, ultrawide band communications, and so on). More simply, output from a signal generator as described herein can be used as an input signal for modulation and demodulation blocks of transmit and receive chains in wireless communications systems.

As used herein the phrase "microwave frequency band" can be used to refer to frequencies between approximately 300 MHz and 300 GHz. In other embodiments, higher or lower frequency sinusoids may be output from a signal generator as described herein. In other embodiments, square waves may be output from a signal generator as described herein and may serve as a digital clock signal driving a digital logic circuit.

Further to the examples introduced above, a signal generator, as described herein, includes a controller operably coupled to a photonic integrated circuit. The controller can be configured to receive feedback from (in some examples) the photonic integrated circuit and to, based on that feedback, adjust one or more operational parameters of the photonic integrated circuit so as to maintain environment-invariant, temperature-invariant, and vibration-invariant output. In other cases, the controller can be configured to receive feedback from each path of a distribution network to which the signal generator is coupled. In particular, the controller can be configured to determine a phase delay of each respective branch of the distribution network by adjusting phase of each branch to account for environmental and/or path-length phase delays specific to that specific branch.

For example, an optical signal as described herein can be split along multiple paths by an optical splitter (binary, cascading, any suitable splitting topology may be used). Each path output by the splitter may include a partially reflective path element referred to as a reflector (e.g., Bragg grating, mirror, filter elements, and so on). Reflections from the reflective element can be extracted by a circulator. Output of a photodiode coupled to an appropriate output of the circulator can be used by the controller to determine an appropriate phase delay in respect of that particular branch and/or other branches so as to bring all branches of optical signal into phase, regardless of the path length or environmental experience of each respective branch.

For example, a controller may be coupled to one or more heating elements thermally coupled to one or more optical waveguide or photonic circuit elements so that upon detection of drift from nominal can be provided with electrical power so as to locally increase temperature of an optical waveguide or photonic circuit element, thereby inducing thermal expansion and/or other changes in index of refraction.

Additionally or alternatively, current through the heaters can be controlled by the controller so as to maintain a particular temperature of the photonic elements, ensuring consistent performance thereof. More simply, a controller as described herein can leverage phase shifters, such as electrically-controllable heating elements to introduce a controllable phase shift in light confined by within a waveguide or other photonic element associated with a signal generator as described herein.

This is merely one example; a controller as described herein can be configured to modify and/or control one or more frequency, amplitude, and/or phase characteristics of light passing through any suitable portion of a photonic integrated circuit as described herein.

Additionally or alternatively, a controller as described herein can be configured to generate and/or modulate an electric field with flux directed through a waveguide or other photonic element. Magnitude of the electric field can influence electric permittivity through the waveguide, thereby controllably modifying an index of refraction (locally) thereof. More simply, a controller as described herein can leverage control of electric fields to introduce a controllable phase shift in light confined by within a waveguide or other photonic element associated with a signal generator as described herein.

Additionally or alternatively, a controller as described herein can be configured to generate and/or modulate a magnetic field with flux directed through a waveguide or other photonic element. Magnitude of the magnetic field can influence magnetic permittivity through the waveguide, thereby controllably modifying an index of refraction (locally) thereof. More simply, a controller as described herein can leverage control of magnetic fields to introduce a controllable phase shift in light confined by within a waveguide or other photonic element associated with a signal generator as described herein.

In some constructions, a controller can be configured to leverage current control to modify output of a laser diode in addition to current control through one or more resistive heating elements, in addition to voltage control in respect of one or more electric field point or plate sources, in addition to current control in respect of one or more electromagnetic elements.

In many embodiments, and as noted above, the photonic integrated circuit of a signal generator as described herein is configured to provide a stable soliton pulse train output as input to excite a photosensitive region/area of a high-speed photodiode which, in response, provides a frequency and phase stable sinusoidal electrical output that may be used in any suitable manner by any electronic circuit.

In many embodiments, a photonic integrated circuit of a signal generator as described herein includes one or more laser light sources configured to output narrow-band laser light at center frequency referred to herein as an "optical carrier" frequency. The laser light source(s) may be a distributed feedback laser, although in other embodiments other laser light sources may be suitable. The laser light source is optically coupled (via a photonic wire bond in one embodiment, or a tapered waveguide in another embodiment) to a waveguide, which can be formed from a material such as silicon nitride, aluminum nitride, chalcogenide, lithium niobate, indium phosphide, crystalline silicon, or any other suitable materials. As a result of this construction, laser light output from the laser light source can be confined within the waveguide.

A wavelength locking resonator, which may be a ring resonator, is positioned adjacent to the waveguide. As a result of this construction, a portion of light confined by the waveguide couples into the wavelength locking resonator. Light confined by, and resonating within, the wavelength locking resonator thereafter interacts with, and interferes with, light confined by the waveguide.

More specifically, as may be appreciated by a person of skill in the art, bandwidth of light confined by the waveguide may be further narrowed by interaction with light within the wavelength locking resonator coupling back into the waveguide. In other cases and constructions, other photonic or optical elements may be used in addition or in the alternative to reduce linewidth of an optical signal as described herein, such as a Bragg grating.

In some cases, the waveguide can include one or more reflective elements configured to at least partially reflect light back toward the laser light source or to a calibration photodiode. In some cases, a circulator can be included to extract reflected signals toward a calibration system, which may include a photodiode. In some cases, reflections can be used for self-mixing and/or self-referencing stabilization of carrier envelope offset.

After linewidth narrowing by the wavelength locking resonator, light confined by the waveguide can couple into an MZI or other modulation structure (e.g., acousto-optic modular) that can be leveraged by the controller to further tune amplitude, phase, and/or frequency of linewidth-narrowed light confined by the waveguide. In some cases, an MZI may not be required and/or may be replaced by another photonic element. In these constructions, the MZI or other modulation structure can be used for relative intensity noise cancellation/reduction or other noise cancellation/reduction operations.

A high-Q resonator which may be a multimode resonator or single mode resonator), which in some configurations can be configured for a whispering gallery mode operation, is positioned adjacent to the waveguide, after the wavelength locking resonator and MZI. As a result of this construction, output of the MZI (confined by the waveguide) can optically couple at least a portion of its contained light into the high-Q resonator, in some cases via a photonic wirebond. As used herein, "high-Q" may be used to refer to a resonator with a quality factor exceeding 100,000. In some cases, a high-Q factor may exceed several million. In some cases, a high-Q factor can exceed a billion. As known to a person of skill in the art, infinite quality factor is not possible; it is reasonably understood that a high-Q quality factor corresponds to a real and finite number of high magnitude, such as 100000, 1000000, 1000000000, 1000000000000, or the like.

As a result of the described construction, light confined within, and moving through, the high-Q resonator can thereafter optically couple back into the waveguide (e.g., via a photonic wirebond or a tapered coupling, as one example) and/or interact with, and/or interfere with, the linewidth-narrowed light confined by the waveguide. More specifically, as a result of the operation of the high-Q resonator, a soliton pulse train is introduced into the waveguide. In some embodiments, the high-Q resonator may be a multimode oscillator which may improve coupling tolerances when manufacturing.

As may be appreciated by a person of skill in the art, the corresponding frequency spectrum of the soliton pulse train confined within the waveguide, after interacting with the high-Q resonator, resembles an ideal broad band frequency comb. However, in real-world implementations, the frequency domain representation of the time domain signal resulting from operation of the high-Q resonator, may retain significant frequency content at or around the optical carrier frequency, which in turn may result is a sub-optimal soliton pulse shape in the time domain.

More simply, a threshold quantity of optical power at the optical carrier frequency may remain, having not interacted with either linewidth narrowing photonic circuitry or the high-Q resonator. As a result, the frequency domain representation of the soliton pulse includes an outsized spike (which may be undesirably wider band than the tines of an ideal optical frequency comb) centered at the optical carrier frequency. This effect results in a sub-ideal soliton time-domain shape.

To mitigate effects of residual optical carrier content in each soliton pulse, the soliton pulse train (confined by a waveguide after interacting with the high-Q resonator) can be optically coupled into a second filtering resonator that serves to further extract residual optical carrier spectral content, further refining the time-domain shape of each soliton of the soliton pulse train, in turn further improving the stability of the period separating each soliton pulse which in turn improves the regularity of separation between tines of the comb structure defining the frequency domain representation of that signal.

In some cases, a chain of filtering resonators (either before or after interaction with the high-Q resonator) can be included in series, each configured to extract from the soliton pulse train spectral content at the optical carrier frequency.

As noted above, the refined soliton pulse train can there-after be optically coupled to a distribution network, which may include one or more passive or active photonic circuit paths. A terminal end of each optical circuit path of the distribution network (also referred to as a splitter), can be optically coupled to a high speed photodiode, which, when excited by each refined soliton of the (distributed) soliton pulse train, generates an electrical signal having, in some cases, a sinusoidal shape.

In other cases, a series of electrical pulses may be output by the photodiode. In other cases, more than one photodiode may be used for, as one example, balanced detection. In some cases, the signal can be down-sampled or down converted to a lower frequency suitable for use by an electric circuit, such as a wireless communications circuit (e.g., a modulation or demodulation stage of a radio communica-tions device).

Further embodiments described herein relate to manufac-turing of photonic elements that may be used to define a photonic integrated circuit as described herein. In particular, a photonic integrated circuit as described above can include semiconductor components, silicon nitride waveguides, and silicon components. As may be known to a person of skill in the art, these different photonic circuit elements require different manufacturing techniques, some of which may be thermally, chemically, or mechanically incompatible with one another.

These foregoing and other embodiments are discussed below with reference to FIGS. 1-7. However, those skilled in the art will readily appreciate that the detailed description given herein with respect to these figures is for explanation only and should not be construed as limiting.

In particular, FIG. 1 depicts an example signal generator as described herein. The signal generator 100 can be dis-posed within a small form-factor housing, such as the housing 102. The housing 102 can be formed from any suitable material, in any suitable manner. In some cases, the housing 102 is a clamshell housing having an upper part and a lower part. In some cases, the housing 102 may be formed from plastic, whereas in other cases, the housing 102 may be formed at least in part from metal.

In some cases, the housing 102 may be formed with one or more vibration dampening structures or materials, such as foam materials. Further, although the housing 102 is depicted as taking a cubic shape, this is not required of all embodiments; any suitable shape and/or proportions between length, width, and/or height may be selected in further embodiments. In many cases, the housing 102 may take the shape and size of magnitude similar to that of a surface mount integrated circuit or through-hole integrated circuit suitable for consumer electronic device.

The signal generator 100 also includes an optical output port 104 and a control input port 106. The control input port 106 can provide a configuration interface to define one or more signal characteristics of an output provided via the optical output port 104. For example, in some embodiments, the control input port 106 may be a digital data transfer port, such as a USB port or ethernet port, configured to receive configuration information and/or control information in a digital format. Example configuration/control information may be an output frequency of a sinusoidal wave to be output as an optical output from the optical output port 104.

In other cases, the control input port 106 may be config-ured to receive an analog input, such as a voltage. In these cases, a voltage level (and/or a duty cycle, or other analog signal characteristic) can be provided as the control infor-mation and may be proportionately related to the optical output provided via the optical output port 104.

In some cases, the control input port 106 may likewise be configured to receive electrical power to operate the signal generator 100. The received electrical power can be direct current or alternating current or a DC-biased alternating current. In further examples, the signal generator 100 can be wirelessly powered.

These foregoing examples are not exhaustive of the attributes and/or properties of a signal generator as described herein. To the contrary it may be appreciated that in many embodiments, a signal generator can take another form than that shown in FIG. 1. For example, in some cases, a signal generator as described herein can be integrated into a larger electronic device or component, for example as a clock source of a computing resource or device. In such cases, a housing such as the housing 102 may not be required, or may be included as a module enclosure disposed within a housing of such an electronic device or computing resource. Like-wise, the control input port 106 and/or the optical output port 104 may not be required and may be optically and/or conductively coupled to suitable other systems.

More broadly, it may be appreciated that these foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the con-trary, it will be apparent to one of ordinary skill in the art that many modifications and variations are possible in view of the above teachings.

Figure 2A:
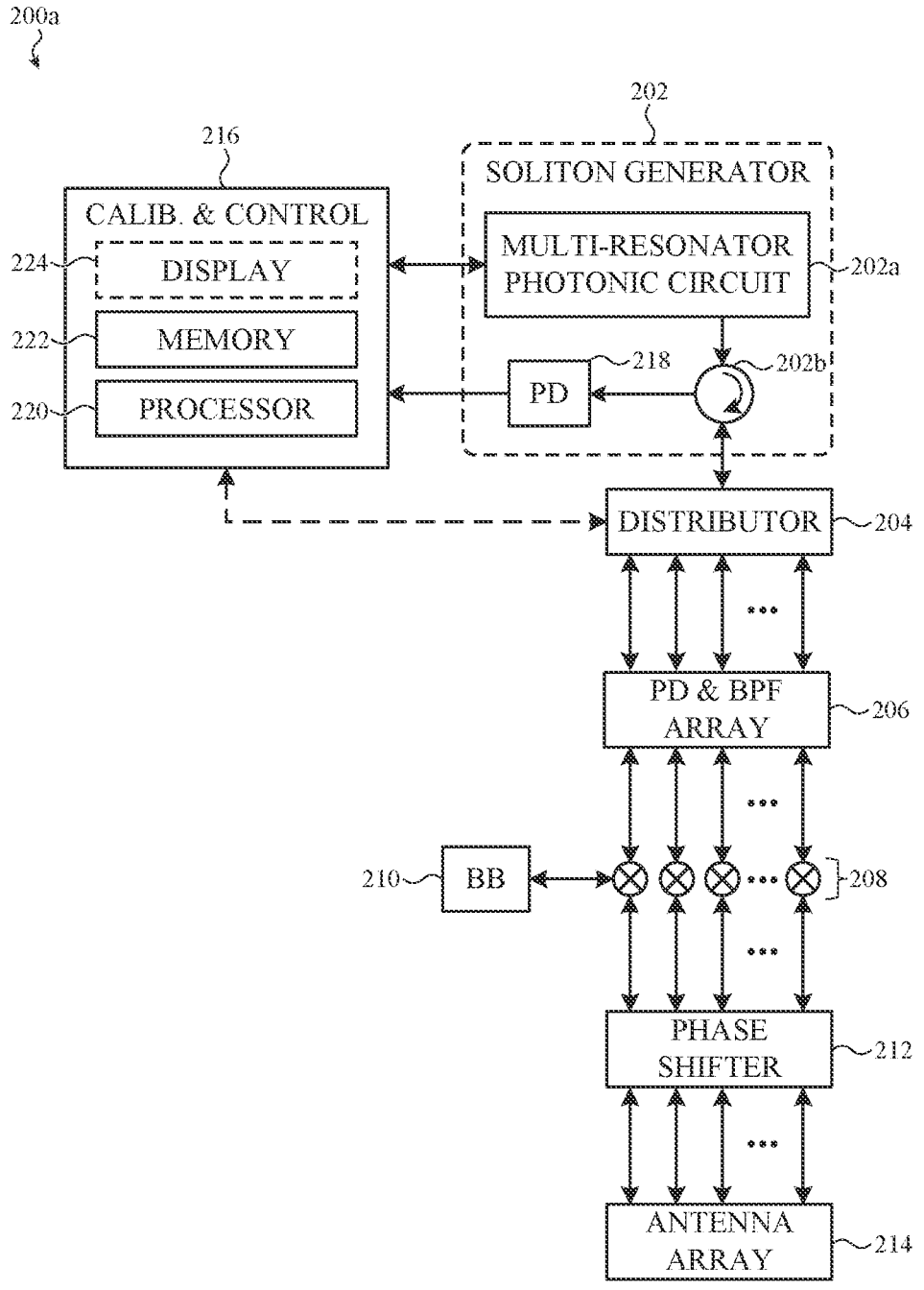
FIG. 2A depicts a system diagram of a signal distribution system, such as described herein.

FIG. 2A depicts a system diagram 200a of a signal generator and signal distribution system that may be used with a wireless communications system. For example, out-put of the signal generator depicted in FIG. 2A and described in reference thereto can be used to generate a refined soliton pulse train that, in turn, can illuminate one or more high-speed photodiodes. Output of the photodiodes can in turn be each respectively filtered (e.g., band pass filtering), option-ally down-sampled or down-converted to a lower frequency usable by an electronic circuit.

The signal generator depicted in FIG. 2A includes a soliton generator. The soliton generator 202 can be disposed within a housing (not shown) that is configured to enclose, support, or otherwise retain a controller, a photonic integrated circuit and/or other components. Specifically, in the illustrated embodiment, a soliton generator 202 can be configured to provide a soliton pulse train as output as described above.

Specifically, the soliton generator 202 includes a multi-resonator photonic circuit 202a. The multi-resonator photonic circuit 202a is configured to provide as output a train of solitons which, in some examples, may be Dissipative Kerr Solitons ("DKS").

In many constructions an output of the multi-resonator photonic circuit 202a can be optically coupled to a photo-sensitive region of a high speed photodiode. The photodiode receives each soliton output from the multi-resonator photonic circuit 202a and generates an electrical signal in response, thereby converting the sequence of solitons into a periodic electric signal.

The periodic electric signal output from a photodiode illuminated by output of the multi-resonator photonic circuit 202a can be used as a reference or modulation signal in an electronic circuit. In some cases, the periodic electric signal is provided as input to a phase accumulator (or clock) input of the direct digital synthesizer or other incrementing digital to analog circuit. In other cases, the periodic electric signal can be filtered with a filter such as a band pass filter.

It may be appreciated that a photodiode, as described above, functionally serves as a low pass filter that attenuates high frequency content of each soliton pulse that illuminates it. In particular, each soliton is defined by an envelope and a carrier signal (herein, the "optical carrier signal"). The optical carrier signal is the same frequency as the laser diode whereas the envelope exhibits properties and shape characteristics that depend upon the optical and physical properties of the multi-resonator photonic circuit 202a. For example, some constructions of the multi-resonator photonic circuit 202a may result in a wider envelope than others.

Regardless of the shape of the envelope and the frequency of the optical carrier frequency, the combined waveform, as noted above, may be referred to in respect of the time domain as a soliton pulse and may be referred to with respect to the frequency domain as an optical frequency comb.

More particularly, as noted above, the spectral representation of each soliton of a soliton pulse train corresponds to a frequency-domain shape typically referred to as an optical frequency comb, in which tines of the comb are spaced at a frequency interval corresponding to the inverse of the time interval (e.g., time period) separating each soliton pulse.

For example, given an ideal soliton shape in the time domain, without carrier envelope offset (i.e., relative phase drift between the envelope and the optical carrier), the resulting frequency domain representation has spikes spaced at regular intervals starting at arbitrarily low frequencies and extending to arbitrarily high frequencies. These spaced-apart spikes are visually similar to a comb and thus the name "optical frequency comb."

For an ideal frequency comb shape, all frequency components (i.e., tines of the comb) would have measurable amplitude, thereby collectively defining the characteristic shape. An ideal, infinitely-fast response time photodiode could convert such a train of ideal solitons into a corresponding electrical signal with identical frequency domain properties.

In real implementations, however, a photodiode has a nonzero response time and cannot convert arbitrarily high frequency tines of even an ideal optical frequency comb into corresponding frequency components of an electrical signal.

In effect, therefore, a real photodiode serves as a low pass filter, attenuating high frequency content (such as, in many examples, the optical carrier) upon conversion from the optical domain to the electrical domain. In another phrasing, a photodiode such as those described herein can be considered to provide, as output, a filtered electrical signal that corresponds to, but does not contain the entire spectrum of, the optical signal used to illuminate that photodiode.

In many embodiments, this filtered electrical signal can be furthered filtered by a band pass filter so as to effectively select a single "tine" of the frequency spectrum of the now-filtered optical frequency comb, the tine being lower frequency than the optical carrier but nevertheless being mode locked with the optical carrier (e.g., in phase).

An example follows. If the repetition frequency in the time domain of a soliton pulse train is $t_{rep}$ then the separation, in the frequency domain, between individual tines of the corresponding optical frequency comb is $1/t_{rep}$. An example repetition rate may be 10 GHz, corresponding to a period of 0.1 ns separating each soliton. An optical carrier frequency in this example may be in the infrared band, having a frequency on the order of 100 s of terahertz, corresponding to an order of 100 s of cycles per picosecond. An example photodiode may have a response time on the order of single picoseconds. For this example, the photodiode may be considered to exhibit a response time of one picosecond.

In this example, the photodiode serves as a low pass filter of the frequency content of the optical frequency comb, with the 1 ps response time defining the cutoff frequency of that filter. More simply, the only tines of the frequency comb that are detectable by the photodiode have a lower frequency than, at a maximum, 1 THz (corresponding to the response time of the photodiode of 1 ps). In this manner, the optical carrier frequency (in the 100 s of THz) is filtered from the photodiode output.

Continuing the example, it may be appreciated that each of tine of the optical frequency comb—either before or after filtering by the photodiode—is separated by 10 GHz, the repetition rate of the soliton pulse train. In this manner, a band pass filter centered over a desired tine, can be designed to exhibit a band width of 10 GHz or less so as to filter only that single tine from the frequency content of the electrical signal output by the photodiode. In most implementations, however, the band width of such a band pass filter is significantly smaller than 10 GHz. For example, in many implementations, a band pass filter as described herein can have a half-power bandwidth on the order of tens of MHz, such as 20 MHz.

An implementation of the foregoing example may call for a stable, low phase-noise sinusoidal signal with a frequency of 300 MHz. In this example, the optical frequency comb may have tines at 10 GHz, 20 GHz, 30 GHz, and so on up to and including 290 GHz, 300 Ghz, 310 GHz, up to and including frequencies surrounding the optical carrier frequency such as 200 Thz (e.g., 199.99 THz, 200.00 THz, 200.01 THz and so on each separated by 10 GHz).

As noted above, the photodiode is only capable to detect frequencies below 1000 GHz (1 THz), and therefore the electrical signal output by the photodiode includes only those tines from 10 GHz to 1000 GHz. A band pass filter with a band width of 20 MHz and centered at 300 GHz can be used to attenuate substantially all remaining frequency comb tines apart from the pass band of 300 GHz. Example attenuated frequencies include those at 10 GHz, 20 GHz, 30

GHz, . . . , 290 GHz and 310 GHz. In this manner, the electrical output of the system may be a frequency stable, extremely low phase-noise, sinusoidal wave at precisely 300 GHz.

By changing one or more properties of the preceding example, it may be appreciated that any suitable tine, at any suitable frequency can be obtained by selection or design of, without limitation: a photodiode with a particular response time; a particular band pass filter with a selected center frequency; a soliton pulse repetition rate; and so on.

Furthermore, it may be appreciated that the soliton rate provided above is merely one example; solitons in other examples may be provided as output at a different rate. In many cases, the rate of the soliton output from the multi-resonator photonic circuit 202a may be based at least in part on a construction and/or operational mode of a laser light source of the multi-resonator photonic circuit 202a and/or a geometry of one or more circuit elements of the multi-resonator photonic circuit 202a.

For example, as noted above, the multi-resonator photonic circuit 202a includes a high-Q resonator configured for, in some examples, whispering gallery mode operation. In other cases, the high-Q resonator can be configured to resonate without leveraging a whispering gallery mode of operation. As may be appreciated, dimensions and/or optical properties (e.g., refractive index) selected for the high-Q resonator can inform at what frequency solitons are output therefrom.

In many embodiments, however, output from the multi-resonator photonic circuit 202a is not limited to produce a single, stable frequency reference as output.

For example, as illustrated in FIG. 2A, output of the multi-resonator photonic circuit 202a can be provided as input to a distributor 204. The distributor 204 can be an active or passive device configured to split the optical output of the soliton generator 202 along two or more paths. In some cases, the distributor 204 can include one or more MZI or other photonic circuit elements such that different paths may be enabled or disabled on demand. More specifically, in many embodiments individual branches of the distributor 204 may be addressable.

In other cases, the distributor 204 can include a passive optical splitter that divides optical power across multiple waveguides. In some embodiments, the distributor 204 can include one or more optical circulators so as to redirect reflections from returning to the soliton generator 202.

The distributor 204 can also include one or more amplifiers configured to increase optical amplitude of one or more frequencies of light.

Multiple outputs of the distributor 204 can feed into respective optical to electrical conversion chain (identified collectively in FIG. 2A as the optical to electrical conversion chains 206), which can each include at least a high speed photodiode and a band pass filter. In particular, each individual divided optical output of the distributor 204 can be optically coupled to a high speed photodiode.

Output of the high speed photodiode can, in turn be coupled to an input of a band pass filter, such as described above. The band pass filter can have any suitable band width and center frequency. In many cases, the band pass filter of each optical to electrical conversion chain of the optical to electrical conversion chains 206 can have a band width of 20 MHz or less. In other cases, a wider pass band width or a narrower pass band width may be selected or appropriate. In many cases, a band pass filter can have a dynamically configurable center frequency so that a system as described herein can be switched between different outputs.

In some embodiments, each chain of the optical to electrical conversion chains 206 can be configured to isolate the same frequency from the optical frequency comb. More simply, each chain can include a band pass filter configured for the same center frequency. This, however, is not required and in some embodiments different band pass filter configurations can result in multiple mode locked frequencies being output by the system.

For simplicity of description, the depicted embodiment can be configured in such a manner such that each of the optical to electrical conversion chains 206 are configured with a similarly configured photodiode and band pass filter (and/or other electronics such as operational amplifiers or the like). In these constructions output from the optical to electrical conversion chains 206 may be in-phase signals of the same frequency. Essentially, different in-phase copies of the same sinusoidal signal.

Importantly, in some embodiments, the distributor 204 can include, and/or may be coupled to, optical paths of different length. For example, a first path can terminate at a first location and a second path, connected via fiber optic as one example, can terminate at a second location separate from the first location. In these embodiments, phase shift as a result of path length changes can be compensated for by introducing a phase shift. For example, each termination can include a reflector (e.g., Bragg reflector) that reflects a portion of light confined by the respective waveguide/path. A circulator can divert these reflections to a controller (such as described below) so as to tune phase delay for each respective path. In these examples, as a result of tuning, each path regardless of length can be in phase.

In these examples, operation of similar photodiodes and band pass filters at each remote location can result in in-phase reference signals. These phase-stable and frequency stable reference signals can be useful as modulation or demodulation local oscillators. For example, levering signals as described herein can significantly improve signal to noise ratio and effective aperture of a multi-element radio imaging system, such a radar array leveraging beamforming techniques to improve resolution.

Similarly, 5G NR or Wi-Fi 6 (or higher) radios that leverage multiple antennas and beamforming techniques (on either or both transmit or receive side) can benefit from highly stable local oscillators. Other electronic devices that can benefit from highly stable local oscillators include, but are not limited to: radar systems (detecting, locating, tracking, imaging, and so on); time of flight systems; geological imaging; meteorological imaging; RFID systems; warehouse location systems; private cellular networks; public cellular networks (radio head units, user equipment, and so on); astronomy systems; radio telescope systems; and so on. These examples are not exhaustive; any analog or digital system can benefit from the stable reference signals as described herein.

In the illustrated embodiment, output of the optical to electrical conversion chains 206 can be provided as a carrier reference to a set of modulators 208 that each respectively receive one signal to modulate, such as the baseband signals 210. A person of skill in the art may readily appreciate that this simplified signal processing pipeline is not exhaustive of the elements or modulation stages required or desired for wireless communications; the figure is simplified only to emphasize the function and operation of the soliton generator 202 and components associated directly therewith.

In this example, after a baseband signal is modulated by a respective one modulator served with input of a reference signal as provided from output of the soliton generator 202, the upconverted signals can be provided as input to a phase shifter 212, which can impart analog phase shifts to one or more of the signals (e.g., for beam steering or beamforming purposes, as one example). Thereafter, the phase-shifted signals can be provided as input to an antenna array 214 for emission into the local radio environment.

A person of skill in the art make likewise appreciate that the system diagram 200a can be understood as either a transmitter or a receiver. Further still, it may be appreciated that the modulation and/or demodulation stages shown may not be required in some embodiments. For example, some transmitted and/or received signals may be shifted to intermediate frequencies, filtered, and thereafter demodulated to baseband or modulated for transmission via an antenna. In other examples, signals received at the antenna array 214 can be phase shifted by the phase shifter 212 and demodulated to a set of baseband signals (optionally, demodulated through one or more intermediate frequencies), suitable for use by other systems. More broadly, it may be appreciated that the illustrated embodiment in respect of wireless communications is merely one example use case of the systems and methods described herein in which a soliton pulse train is leveraged to generate a phase stable signal of substantially any frequency.

In many cases, the soliton generator 202 may be operationally coupled to an autocalibration controller 216 so as to monitor input and/or output to the soliton generator 202. For example, the autocalibration controller 216 can be optically coupled, via a photodiode, to the multi-resonator photonic circuit 202a so that output from the multi-resonator photonic circuit 202a can be monitored and fluctuations therein can be compensated. In other cases, the autocalibration controller 216 can be coupled to one or more thermal sensors so as to monitor a temperature of the soliton generator 202, the distributor 204, and/or the optical to electrical conversion chains 206.

The autocalibration controller 216, in some embodiments, may be configured to receive a control signal from an external resource, such as a separate computing device, an analog input apparatus, or any other suitable input source. This control signal can inform the controller to cause the soliton generator 202 to output a particular soliton pulse at a particular repetition rate and/or having particular properties. In other examples, the control signal can be received directly by the soliton generator 202. In yet other examples, the control signal can be routed partially to the controller and partially to the soliton generator 202. These examples are not exhaustive; it may be appreciated that the soliton generator 202 can be configured to receive and/or apply any suitable configuration to the soliton generator 202 in any suitable digital or analog manner.

In many embodiments, the autocalibration controller 216 may be configured to automatically calibrate operation of the distributor 204. For example, as noted above and with respect to many embodiments described herein, the autocalibration controller 216 can be configured to re The controller can be implemented in a number of suitable ways. For example, in one embodiment, the controller is defined at least in part by a processor 220 and a memory 222. In such configurations, the processor 220 can be configured to access the memory 222 to retrieve therefrom at least one executable asset, such as a binary executable file and/or one or more executable instructions. By cooperation with the memory 222, the processor 220 can instantiate an instance of software—referred to herein as a firmware instance—that, in turn, executes one or more control routines to perform, coordinate, or otherwise execute one or more operations of the soliton generator 202.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, as described herein, the term "memory" refers to any software and/or hardware-implemented digital data storage device or circuit physically and/or structurally configured to store, in a volatile and/or nonvolatile manner, one or more digital representations of data or data objects. This term is meant to encompass both memory structures and databases, as well as the physical media supporting storage thereof.

In some embodiments, the autocalibration controller 216 can also include a display 224. The display 224 can be operably intercoupled with the processor 220 and/or the memory 222 and may be configured to display information instructed by a firmware instance. Example information that may be displayed by the display 224 can include, but may not be limited to, a waveform type configured to be output by the soliton generator 202, a frequency at which the system is configured to provide output, and so on. In other cases, other configuration parameters may be shown via the display 224. In still further examples, the display 224 can be configured to render a graphical user interface or console interface defined at least in part by firmware instantiated by cooperation of the processor 220 and the memory 222.

In some embodiments, a photodiode 218 can be included to provide feedback to the controller. For example, the photodiode 218 can optically tap into any suitable portion of the multi-resonator photonic circuit 202a to monitor one or more performance or operational characteristics thereof. For example, the photodiode 218 can be coupled to a circulator 202b interposing an optical output of the multi-resonator photonic circuit 202a and an optical input of the distributor 204. As a result of this construction, reflections in respect of each respective path output form the distributor 204 can return to the distributor 204 (note the arrow directions between the optical to electrical conversion chains 206 and the distributor 204), and may be extracted by the circulator 202b and provided as input to the autocalibration controller 216 via the photodiode 218. As a result of this construction, the autocalibration controller 216 can correct phase delays in respect of each individual path output by the distributor 204.

This example is not exhaustive; a person of skill in the art further appreciates and understands that in many embodiments multiple photodiodes and multiple circulators may be used, such as within each signal path from the distributor 204 to the optical to electrical conversion chains 206.

These foregoing examples are not exhaustive of the attributes and/or properties of a signal generator as described herein. To the contrary it may be appreciated that, in many embodiments, a signal generator can take another form than that shown in FIG. 2A. More broadly, it may be appreciated that these foregoing embodiments depicted in FIG. 2A and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 2B:
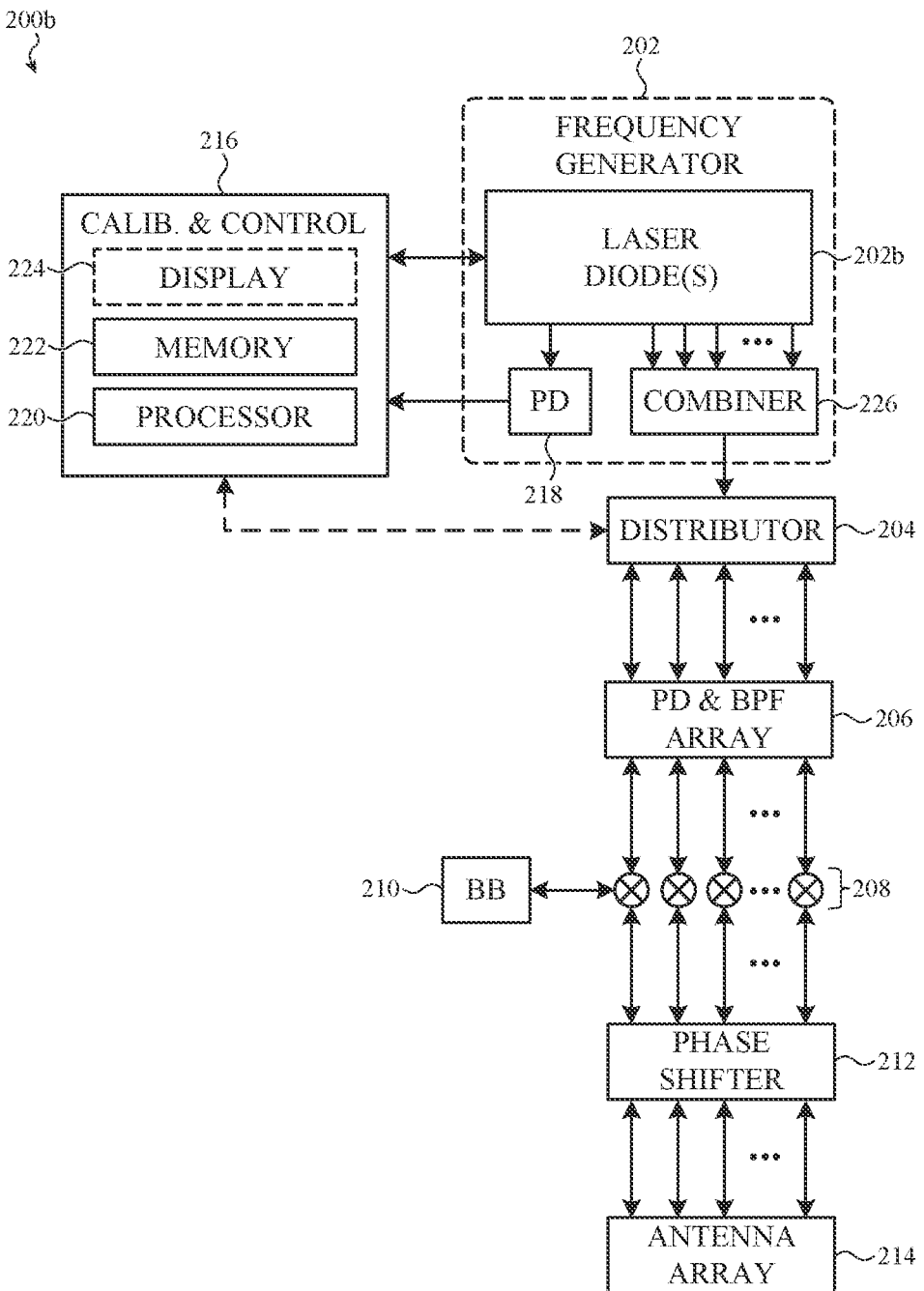
FIG. 2B depicts a system diagram of another signal distribution system, such as described herein.

For example, FIG. 2B depicts a system diagram 200*b* including a frequency generator 202 or periodic signal generator including a number of laser diodes 202*b* (which may be integrated or discrete) that each feed laser output into a combiner 226 (which may be before or after optical amplification). This structure can be leveraged to generate an optical beat frequency that, in turn can be provided as input to the distributor 204

In other cases, another photodiode not pictured can be coupled to suitable port of a circulator in turn coupled into an optical path of the depicted system. In these examples, as noted above, a reflector within the optical path can reflect a portion of optical power and this reflection can be extracted by operation of the circulator (not shown; reflections from the distributor 204 that may be received and/or leveraged by the autocalibration controller 216 are shown as dotted lines) so as to illuminate the second photodiode and provide useful feedback to the autocalibration controller 216 that can inform operation of the distributor 204.

Figure 2C:
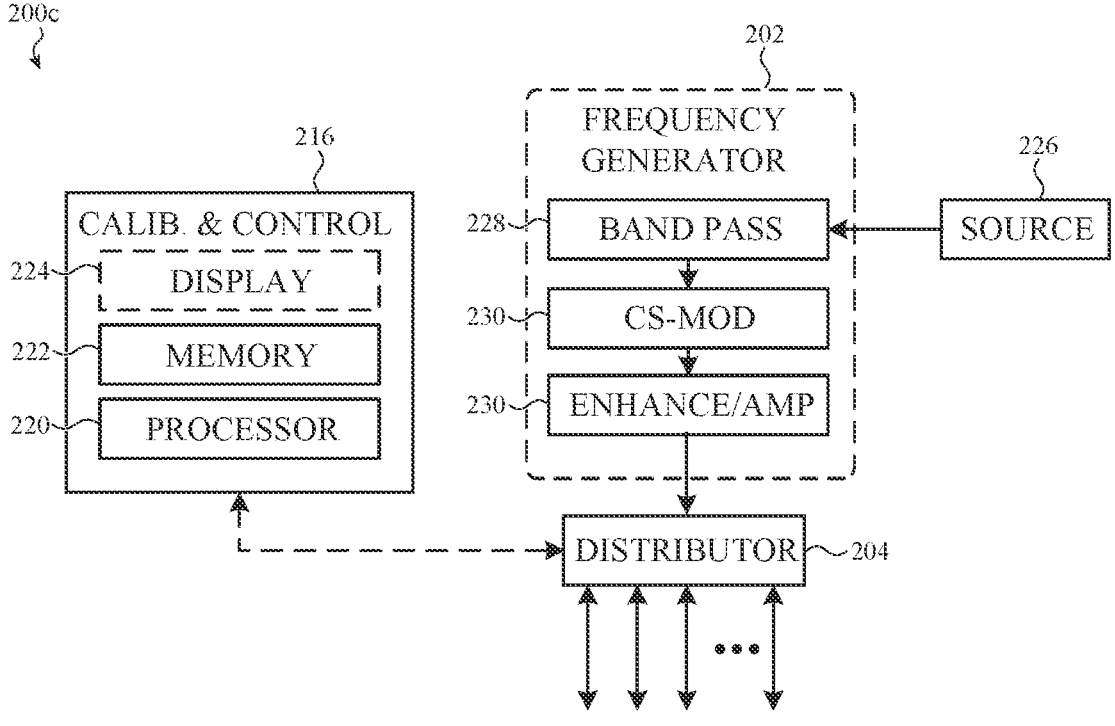
FIG. 2C depicts a system diagram of another signal distribution system, such as described herein.

In yet other cases, external signal sources may be used to generate an optical signal as described herein. For example, FIG. 2C depicts a system diagram 200*c* in which the frequency generator 202 receives input from an external RF source 226. The RF source 226 can be provided as input to a band pass filter 228, and thereafter as input to a modulator 230. The optical output of the modulator 230 can be enhanced and/or amplified at an output shaping stage 232, after which it may be provided as input to the distributor 204. As with other embodiments described herein, the distributor 204 can be optically coupled to the autocalibration controller 216

These foregoing examples are not exhaustive of the attributes and/or properties of a signal generator as described herein. To the contrary it may be appreciated that, in many embodiments, a signal generator can take another form than that shown in FIGS. 2A-2C. More broadly, it may be appreciated that these foregoing embodiments depicted in FIGS. 2A-2C and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 3:
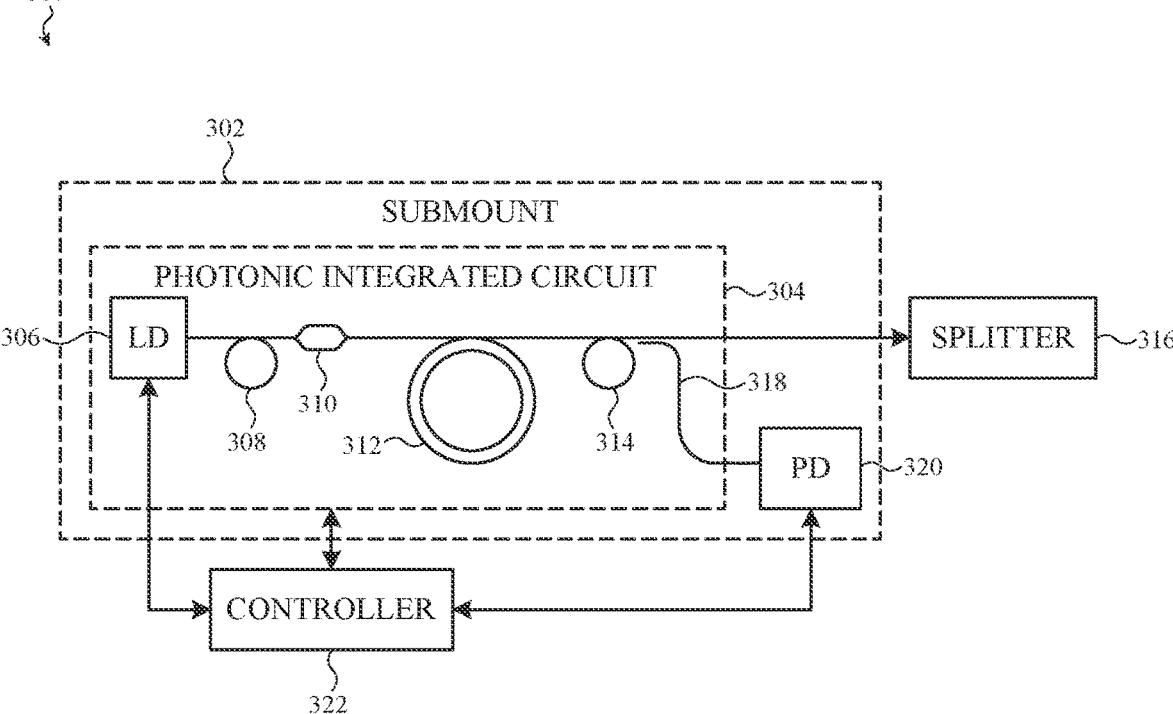
FIG. 3 depicts a simplified plan/schematic diagram of a signal generator incorporating a photonic integrated circuit, such as described herein.

For example, as noted above, it may be suitable to generate a periodic signal by filtering output of an optical comb. FIG. 3 depicts a simplified schematic diagram and/or plan diagram of a signal generator that may serve as input to a distribution system as described herein. Output of the soliton generator/signal generator can be optically coupled to a splitter and distributed to one or more photodiodes for processing.

The signal generator 300 includes a base substrate that can support and/or serve as a base onto which other components of the signal generator 300 can be formed and/or otherwise disposed. In some cases, the base substrate—which is identified as the submount 302—can be formed from bulk silicon, although this is not required of all embodiments.

Onto the submount 302 can be formed a photonic integrated circuit 304. The photonic integrated circuit 304 can include a laser 306, which may be, in some embodiments, a distributed feedback laser. In other cases, a different laser may be used. In still further embodiments, the photonic integrated circuit 304 may not require an integrated laser source; instead, the photonic integrated circuit may receive laser light from an external source, such as via a fiberoptic cable or fiber coupling. However, for simplicity of description and illustration, the signal generator 300 is depicted with an incorporated laser, the laser 306. The laser 306 may be coupled (e.g., soldered, or adhered) to either a substrate associated with the photonic integrated circuit or, in some cases, directly to the submount 302.

Laser light output from the photonic integrated circuit 304 can be confined within a waveguide defined by multiple portions or sections extending from source to output. In these constructions, light output from the photonic integrated circuit 304 is confined by a first portion of the waveguide, after which the light passes to a second portion and so on.

The photonic integrated circuit 304 includes a wavelength locking resonator 308. Some embodiments may make use of a Pound-Drever-Hall (PDH) servo loop to stabilize the light frequency with respect to one or more of the resonators. In some embodiments, the PDH loop may be operated in an offset frequency manner.

As a result of the positioning depicted in FIG. 3, at least a portion of the light contained in the first portion of the waveguide is optically coupled into the wavelength locking resonator 308, and once that light traverses the wavelength locking resonator 308, at least a portion of that light will optically couple back into the waveguide, constructively and/or destructively interfering with light confined in the first portion, thereby further narrowing the bandwidth of light output from the laser 306. Linewidth narrowed light is confined within a second portion of the waveguide.

The photonic integrated circuit 304 also includes, in many examples, a photonic switch 310 (e.g., an MZI as one example) which can be electronically controlled to adjust phase and/or amplitude of light confined to the second portion of the waveguide. In many cases, the photonic switch 310 can be leveraged to ensure that a phase and/or amplitude of light within the second portion is consistent. Modified linewidth narrowed light output from a branch of the photonic switch 310 is confined within a third portion of the waveguide.

The photonic integrated circuit 304 also includes a high-Q resonator, identified as the main resonator 312. The main resonator 312 may be formed from a crystalline material such as magnesium fluoride (MgF2), although this is not required of all embodiments. In some cases, the main resonator 312 can include one or more axial protrusions that facilitate a whispering gallery mode of operation.

As with the wavelength locking resonator 308, the main resonator 312 is formed and/or disposed adjacent to the waveguide, specifically to optically couple (e.g., via a photonic wirebond, in one example) to the third portion of the waveguide. More particularly, as a result of this positioning, at least a portion of the light contained in the third portion of the waveguide, optically coupled into the main resonator 312 and upon resonance, enters a whispering gallery mode (although this mode of operation may not be required of all embodiments).

As a result of this construction and mode of operation, once light confined by the main resonator 312 returns toward the waveguide, at least a portion of that light will optically couple back into the waveguide, injecting a train of solitons into the third portion. The train of solitons, along with any residual optical carrier from the laser 306, is thereafter confined in a fourth portion of the waveguide.

In some cases, light can couple (e.g., via a photonic wirebond) between the waveguide and the main resonator 312 based on positional proximity between the optical elements. In some cases, maintaining relative positioning between the waveguide and the main resonator 312 may present manufacturing challenges. In such examples and/or in some embodiments, optical coupling to and from the main resonator 312 can be accomplished via a photonic wirebond or other single-mode or low-loss waveguide.

In some cases, a tapered waveguide can be positioned near an edge of the main resonator 312 and may be oriented in any suitable direction. In some cases, a waveguide coupling light into the main resonator 312 may be different and separate from a waveguide coupling light from the main resonator 312. Many configurations are possible.

To remove potentially negative effects of a residual optical carrier in the waveguide, the photonic integrated circuit 304 further includes a refining resonator 314 which is configured to extract residual optical carrier spectral energy, leaving only well-defined/refined solitons to propagate into a fifth portion of the waveguide.

The refined sequence of solitons confined by the fifth portion of the waveguide can be provided as input to a distributor network and/or passive splitter, shown as the splitter 316. As with other embodiments, the splitter can include both passive and active components. In many constructions, the fifth portion can be formed with a coupler 318 that directs light confined in the fifth portion toward a high-speed photodiode 320 which, in turn, can provide feedback to a controller 322.

The controller 322, as with other embodiments described herein, can be configured to control one or more photonic circuit elements of the photonic integrated circuit 304, such as controlling an amount of current applied to a heater or heating element configured to normalize the temperature of one or more portions of the waveguide or one or more arms of the photonic switch 310. In many embodiments, the controller 322 can also provide power to the various electrical loads of the signal generator 300.

These foregoing examples are not exhaustive of the attributes and/or properties of a signal generator as described herein. To the contrary it may be appreciated that, in many embodiments, a signal generator can take another form than that shown in FIG. 3.

More broadly, it may be appreciated that these foregoing embodiments depicted in FIG. 3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, it may be appreciated that the photonic integrated circuit depicted in FIG. 3 can be manufactured in a number of suitable ways. In addition, it may be appreciated that the various photonic circuit elements of the photonic integrated circuit can take different forms and/or may be made from different materials in certain embodiments. For example, in some cases, the waveguide may be made from a crystalline silicon whereas, in other embodiments, silicon nitride may be used.

In other cases, other materials suitable for optical waveguides may be used in whole or in part to define one or more optical waveguides and/or optical couplings as described herein. For example, in some cases, aluminum nitride, chalcogenide, lithium niobate, or indium phosphide may be used. In yet other embodiments, one or more components of a system described herein can be fully discrete or fully integrated and co-formed. For example, in some cases, a laser light source may be formed with a photonic structure such as described above. In other cases, the laser light source may be a discrete component placed and/or aligned to a photonic structure as described above. In many cases, the laser light source may be configured to output infrared light, but this is not required of all embodiments.

Further, it may be appreciated that a signal generator as described herein and/or a signal distribution system as described herein can be configured for multiple purposes. (e.g., radar, meteorology, astronomy, computing, multichannel radio communications, full duplex radio communications, and so on). It may be appreciated that each implementation varies and some embodiments include optical or electrical signal processing chain elements that others omit.

For example, generally and broadly, it may be appreciated that a signal generator as described herein can configured in a number of suitable ways, only one of which is as a modulation/demodulation local oscillator for radio communications. This example is instructive, however, and for simplicity of description and illustration, many embodiments described herein leverage radio communications as an example use case. It is appreciated that this is a singular example and that any photonic or electronic circuit receiving a periodic signal as input may be suitable.

Figure 4A:
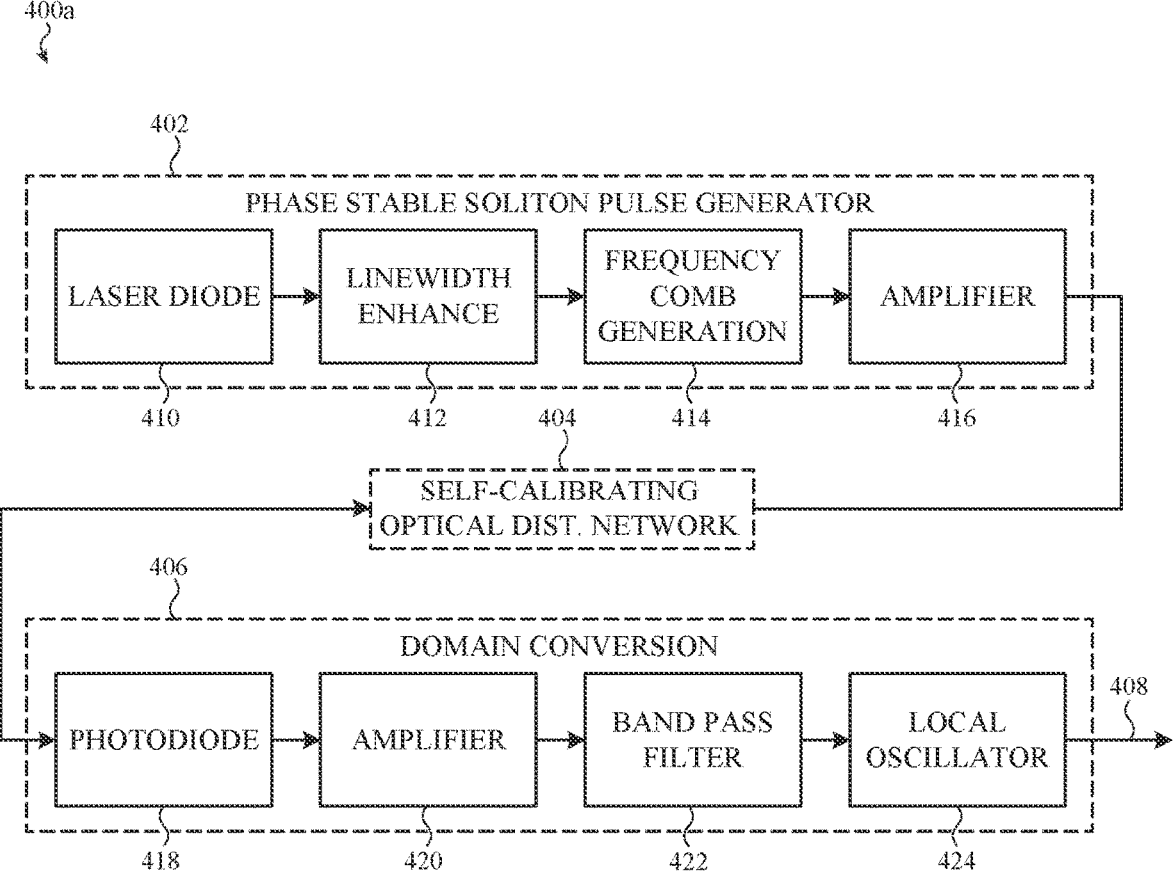
FIG. 4A depicts a simplified plan/schematic diagram of a signal distribution system incorporating a photonic integrated circuit, such as described herein.

FIG. 4A depicts a simplified system diagram of a signal generator as described herein. In particular, the system 400 includes a phase-stable soliton pulse generator 402 coupled, via an optional splitter and/or distributor (identified in the figure as the optical distribution network 404), to an optical to electrical signal converter 406. In this construction, an output of the optical to electrical signal converter 406, identified in the figure as the output 408, can be provided as input to a suitable electrical circuit, for example as a reference signal, a clock signal, a modulation carrier, and so on. As with other embodiments described herein, the optical distribution network 404 can be configured for self-calibration, as described above. In particular, optical signals output by the optical distribution network 404 can be phase shifted and/or amplitude adjusted in order to account for path losses and/or differing phase. For example, as with other embodiments described herein, the optical distribution network 404 can leverage reflections (separated from reference signals by circulators or other appropriate signal separation/filtering techniques), to determine phase and/or amplitude at a termination point or other reference point. Appropriate adjustments to phase and/or amplitude can be introduced into each specific branch output from the optical distribution network 404 such that each optical signal is in phase when such signals are received and converted to the electrical domain by operation of a photodiode.

The phase-stable soliton pulse generator 402 includes a laser diode 410 that provides output to a linewidth enhancement module 412. The linewidth enhancement module 412 is configured to reduce a line width of steady-state or pulsed laser output of the laser diode 410, for example by operation of one or more resonators as described above.

Enhanced linewidth output of the linewidth enhancement module 412 is provided as input to a frequency comb generator 414 which may include a main resonator as described above. The frequency comb generator 414 provides a soliton pulse train as output to, in some cases, an optical amplifier 416. The amplifier 416 may be a doped fiber amplifier, a solid state amplifier, a pumped amplifier, or any other suitable optical amplifier (whether passive or active). In some cases, the amplifier 416 may precede the frequency comb generator 414, but this is not required of all embodiments.

Output of the phase-stable soliton pulse generator 402 can be provided as input to the optical distribution network 404, which can split the soliton pulse train along any number of suitable paths, having different lengths, shapes, or destinations. For example, in some cases, different optical paths can extend for millimeters, centimeters, meters, or kilometers away from the phase-stable soliton pulse generator 402.

In one example embodiment, the optical distribution network 404 can include different terminals distributed over a wide area, such as within a warehouse or building or throughout a section of a residential neighborhood. It may be appreciated by a person of skill in the art that path length may vary from embodiment to embodiment and that power output of the phase-stable soliton pulse generator 402 (and/ or power output of the laser 410 and/or the optical amplifier 416 may cap or otherwise define a maximum path length for a particular branch of the optical distribution network 404.

Each branch of the optical distribution network 404 can terminate with a respective optical to electrical signal converter 406. Each respective domain converter (e.g., optical domain to electrical domain) can include a high speed photodiode 418, an electrical operational amplifier 420, and a band pass filter 422.

In this manner, output of the band pass filter 422 serves as a local oscillator 424 local to the electrical circuit defining that respective optical to electrical signal converter 406. As noted above, properties of the photodiode 418, amplifier (which may be optional), and the band pass filter 422 can define both frequency and phase output from the optical to electrical signal converter 406.

As with other embodiments, feedback/reflections from the optical distribution network 404 can be received and used by a controller to modify the phase of light received at each photodiode of each optical to electrical signal converter 406.

Figure 4B:
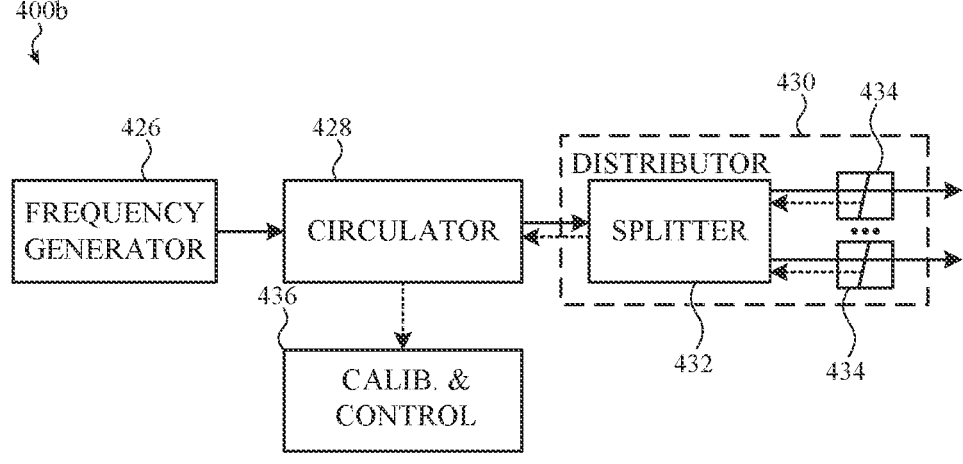
FIG. 4B depicts a generalized simplified plan/schematic diagram of a signal distribution system, such as described herein.

The embodiment depicted in FIG. 4A is merely one example method by which an optical signal can be generated, distributed, and calibrated so as to result in multiple electrical domain reference signals that are in phase with one another. More generally, any suitable signal generator can be used, such as shown in FIG. 4B. In this example, a periodic signal source 426 provides output to a circulator 428 which in turn is coupled to an optical distribution network 430. The optical distribution network 430 includes a splitter 432 that branches the optical signal across two or more paths, each of which can include a reflector element 434. Suitable reflector elements can include integrated or discrete optical mirrors, filters, gratings, and so on.

Reflections from each reflector (reflections depicted as dotted lines, although it may be appreciated that the reflections and each respective signal traverse the same waveguides or optical media) can return to the splitter 432 and the circulator 428. These reflections can be directed by operation of the circulator 428 to a calibration block 436 that can attribute each reflection to a particular path (e.g., timestamps, polarization stamps, frequency stamps, or any other suitable distinguishing characteristic) and induce a phase change within that respective optical path so as to bring each path termination into phase with each other path termination. Delay lines, phase shifters, or other phase modification techniques may be leveraged in different embodiments.

Figure 5A:
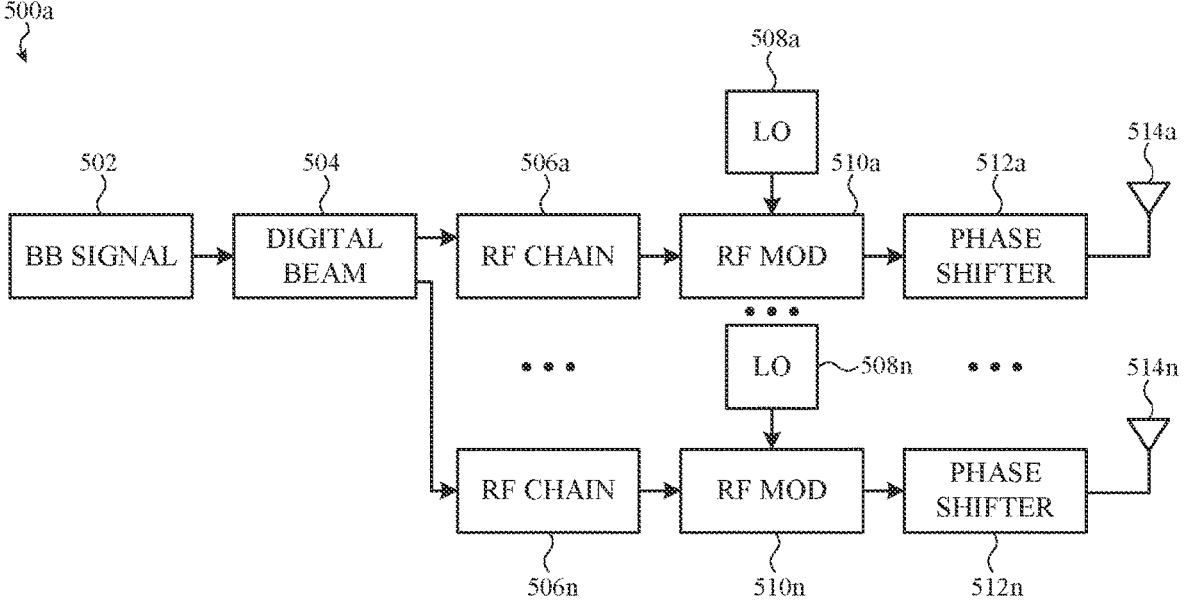
FIGS. 5A-5C depict simplified plan diagrams of a signal distribution system incorporated into a wireless communication system.
Figure 5B:
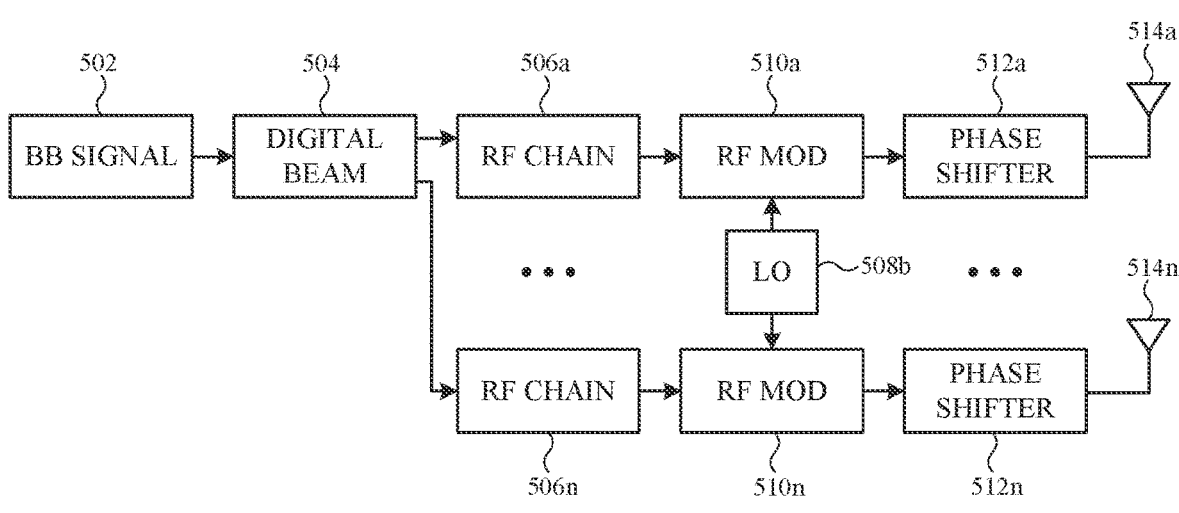
Figure 5C:
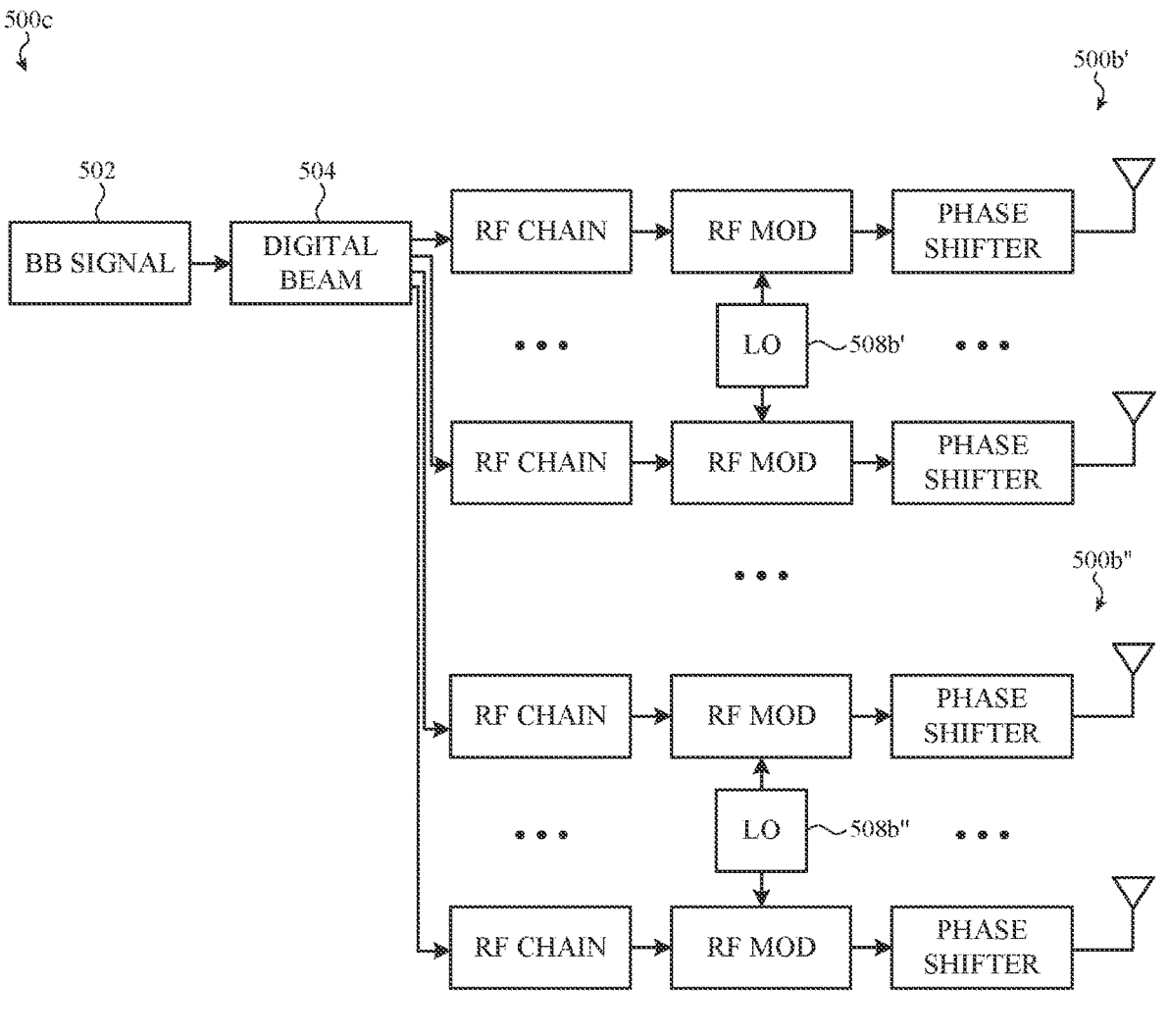

A distributable, in-phase, local oscillator can be used for a number of suitable purposes. For example, in a multi-antenna radio communications device such as a 5G NR remote radio head. FIGS. 5A-5C each depict related example embodiments in which a local oscillator, generated as described above, may be used in a radio communications system configured with beam steering or beam forming functionality.

FIG. 5A depicts simplified plan diagram of a signal distribution system, as described herein, incorporated into a wireless communication system. In this embodiment, the signal distribution system 500a receives from another system and/or generates a baseband signal source 502 that encodes information to transmit wirelessly to another system or device. The baseband signal source 502 may be analog or digital, but in many examples, the signal is understood to be a physically analog signal that encodes digital information in a binary manner (or other suitable encoding). By convention, although the baseband signal itself is embodied as a voltage that varies in time between two or more substantially fixed values, the baseband signal may be referred to as a digital signa. The baseband signal source 502 can be received by a conductive coupling in many embodiments although this is not required. In many cases, the baseband signal source 502 may be serially received by the signal distribution system 500a, whereas in other embodiments, the baseband signal source 502 is loaded into shift registers or another buffering structure such that individual digital can be read in parallel.

The baseband signal source 502 (which, in some examples, may encode digital information conforming to a protocol, such as TCP packets, cellular protocols, encryption protocols, and so on) can be passed to a digital beamforming controller 504 confirmed to apply one or more baseband domain signal modifications (e.g., phase, amplitude, polarity, and so on) suitable for beamforming purposes. For example, in some embodiments, the digital beamforming controller 504 is configured to invert one or more channel characteristics of the local RF environment. More specifically, as known to a person of skill in the art, every local RF environment is different in respect of attenuation, multi-path effects, and so on. These characteristics are often frequency-dependent to a degree such that certain communication channels (e.g., each channel associated with a particular carrier frequency) experience different effects of the local RF environment. These characteristics can be represented as an unknown transfer function $H(f)$, the inverse of which can be approximated by sending known signals (e.g., tokens, headers, and the like) at known or determinable intervals.

On receipt at a receiver of a known signal or known signal segment over a particular channel and transmitted by a transmitter, an inverse $H^{-1}(f)$ can be approximated and parameters defining that inverse transfer function can be communicated back to the transmitter. In these examples, the parameters of the inverse transfer function can inform one or more configuration values, parameters, or operations of the digital beamforming controller 504.

The foregoing example is merely one example; the digital beamforming controller 504 can be configured in a number of suitable ways.

The digital beamforming controller 504 is configured to output n number of independent feeds for up-conversion and emission into the local RF environment. Specifically, the digital beamforming controller 504 can be configured to provide output to an arbitrary number of RF chains, identified in the figure as the set of RF chains 506a through 506n. Each respective RF chain can receive a respecting one copy of a local oscillator signal source (identified as the local oscillator signal sources 508a through 508n) that can be provided as input to each of a respective set of RF modulators 510a through 510n.

Once each respective baseband signal is modulated to the carrier frequency supplied by the local oscillator signal sources 508a through 508n, the RF domain signals can be phase shifted by a respective set of phase shifters 512a through 512n, before being supplied as feed lines to a respective set of antennas 514a through 514n.

The embodiment shown in FIG. 5A, generally and broadly, depicts a multi-antenna construction in which each RF chain includes its own local oscillator signal, which as noted above may be generated by operation of a system including a soliton pulse train generator, photodiode, and band pass filter. In this construction depicted in FIG. 5A, different RF chains can correspond to different carrier frequencies or the same carrier frequency; in other words the local oscillator signal source 508a may produce a different carrier than the local oscillator signal source 508n. In other cases, all signal sources may be the same.

In some examples, some RF chains may be configured for transmitting signals, whereas others are configured for receiving signals. In either construction, a local oscillator can serve a modulation or demodulation purpose.

Dedicated local oscillator signals for each of a set of RF chains is merely one example embodiment. FIG. 5B depicts a signal distribution system 500b in which a local oscillator signal source 508b is shared among all RF chains. All other elements depicted in FIG. 5B may be understood with reference to the foregoing description of FIG. 5A; this description is not repeated.

In still further embodiments, a local oscillator signal source can be shared among multiple RF chain groups. FIG. 5C depicts a signal distribution system 500c similar to FIGS. 5A-5B. In this example, however, groups of different RF chains that share a local oscillator source similar to the embodiment depicted in FIG. 5B (two of which are identified as the RF chain group 500b' and the RF chain group 600b'') are shown. In these examples, a first group of RF chains share a local oscillator 508b' and a second group of RF chains share a local oscillator signal source 508b''.

These foregoing embodiments depicted in FIGS. 5A-5C and the various alternatives thereof and variations thereto are presented, generally, for purposes of explanation, and to facilitate an understanding of various configurations and constructions of a system that can use a local oscillator generated by down-converting an optical carrier frequency by operation of a photodiode and band pass filter to generate a phase-stable and frequency-stable reference signal, such as described herein. However, it will be apparent to one skilled in the art that some of the specific details presented herein may not be required in order to practice a particular described embodiment, or an equivalent thereof. For example, although not shown, it may be appreciated that some embodiments can leverage intermediate frequency conversion stages, filtering stages, beam forming stages, amplification stages, as appropriate.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6:
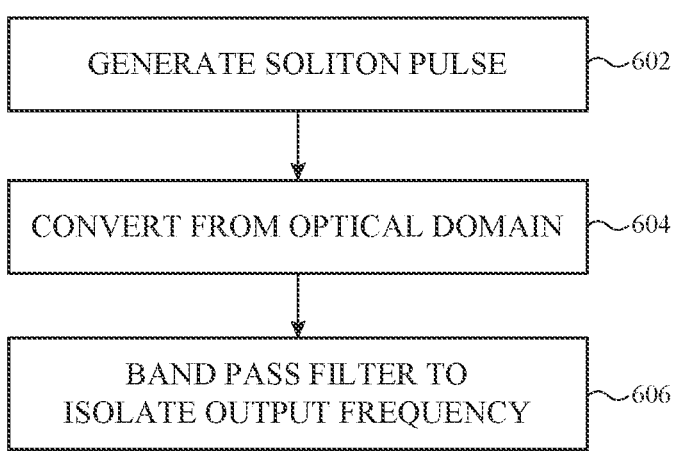
FIG. 6 is a flowchart depicting example operations of a method of operating a signal generator and signal distribution system as described herein.

FIG. 6 is a flowchart depicting example operations of a method of operating a signal generator and signal distribution system as described herein. The method 600 includes operation 602, which may be performed by operation of a signal generator as described above, at which a periodic optical signal is generated or received. An example periodic signal is a soliton pulse is generated. The soliton pulse may include an active feedback system so as to reduce effects of carrier-envelope offset; the carrier (optical carrier) frequency and the envelope of each soliton may be phase locked or more generally, phase drift between the carrier and envelope may be minimized as much as practicable.

The method 600 further includes operation 604 at which the periodic optical signal is optically phase shifted according to a calibration parameter and thereafter converted from the optical domain to the electrical domain. Specifically, the pulse train can be used to illuminate a photodiode with a response time selected higher than a desired output signal. Finally, at operation 606, the electrical signal output by the photodiode can be provided as input to a band pass filter having a center frequency that overlaps a tine of the optical frequency comb corresponding to the soliton pulse train of operation 602.

In some cases, an operation can precede operation 602 in which a target output frequency is selected and thereafter used to tune or adjust an operational parameter of the soliton pulse generator. For example, power supplied to the laser diode can be adjusted to a particular target frequency. In other cases different output lasers that operate at different frequencies can be selectively enabled. Many constructions are possible. Once a target output frequency is selected, that frequency may be used to also tune a parameter of the band pass filter such that the band pass filter overlaps the desired output frequency.

Figure 7:
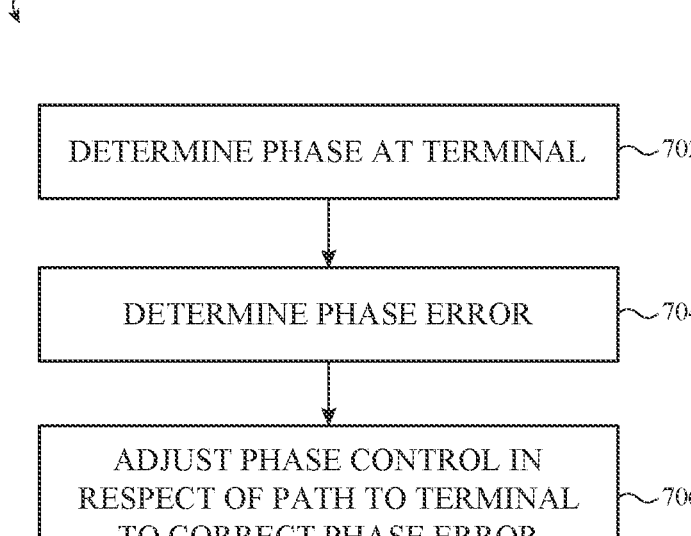
FIG. 7 is a flowchart depicting example operations of a method of calibrating a signal generator and signal distribution system as described herein.

FIG. 7 is a flowchart depicting example operations of a method of calibrating a signal generator and signal distribution system as described herein. As with other embodiments, the signal distribution system is configured to provide as output a stable sinusoidal signal.

The method 700 includes operation 702 at which phase of an optical or RF domain signal is determined at a terminal of that signal. In an optical embodiment, a reflector may be used to direct at least a portion of light back into a circulator which can direct the reflection toward a photodiode for sampling. In other cases, other phase measurement or phase following circuitry can be used to determine phase at an RF domain electrical signal terminal.

Once phase at the terminal is determined, phase error due to path length can be readily calculated and/or otherwise determined at operation 704. Thereafter at operation 706, the phase error can be corrected such that the phase is synchronized in respect of each terminal of the signal distribution system. As one example, a signal generator can be used to generate local oscillator signals for a local area network with remote radio units dispersed throughout the local area, separated by some distance. Fiber optic cables can be run throughout the local area to each remote radio unit. Each optical signal received by each remote radio unit is received at a slightly different phase due to difference in path length of the fiber optic cable (and other optical path components). In these examples, phase error correction can be implemented such that each remote radio unit, regardless of path length or variation, can receive a phase-synchronized reference signal, thereby improving the synchronicity of the system of remote radio units.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As noted above, a signal generator and/or photonic circuit or optical circuit such as described herein can be incorporated into any suitable computing device or computing resource. As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:

1. A self-calibrating reference signal distribution system comprising:
   a signal source configured to provide, as output, a periodic optical signal;
   a circulator configured to receive, as input, the periodic optical signal;
   a splitter configured to receive, as input, output of the circulator, the splitter comprising a plurality of optical paths, at least one optical path comprising a reflector configured to reflect at least a respective portion of the periodic optical signal back toward the circulator as a reflected signal;
   a photodiode optically coupled to the circulator and configured to receive as input the reflected signal; and
   a controller conductively coupled to the photodiode and configured to adjust at least one of a respective phase or a respective amplitude of each of the plurality of optical paths such that each respective portion of the periodic optical signal traversing each respective optical path is in phase.

2. The self-calibrating reference signal distribution system of claim 1, wherein the signal source comprises a laser diode.

3. The self-calibrating reference signal distribution system of claim 2, wherein:
   the laser diode is a first laser diode; and
   the self-calibrating reference signal distribution system comprises:
      a second laser diode; and
      a combiner optically coupled to each of the first laser diode and the second laser diode, the periodic optical signal output by the combiner.

4. The self-calibrating reference signal distribution system of claim 2, wherein the laser diode provides input to a soliton pulse generator configured to provide as output the periodic optical signal.

5. The self-calibrating reference signal distribution system of claim 2, wherein:
   the signal source receives input from an external radio frequency source; and
   the self-calibrating reference signal distribution system comprises:
      a modulator configured to modulate output of the laser diode based at least in part on the external radio frequency source, the periodic output signal output by the modulator.

6. The self-calibrating reference signal distribution system of claim 1, wherein:
   the photodiode is a first photodiode; and
   the self-calibrating reference signal distribution system comprises:
      a second photodiode coupled to an output of an optical path of the plurality of optical paths; and
      a band pass filter configured to receive as input an output of the second photodiode, the band pass filter configured to provide as output a local oscillator signal for an electronic circuit.

7. The self-calibrating reference signal distribution system of claim 6, wherein the electronic circuit is a wireless communications system or a LIDAR system.

8. A self-calibrating reference signal distribution system comprising:
  a signal source configured to provide, as output, a periodic optical signal;
  a circulator configured to receive, as input, the periodic optical signal;
  a splitter defining multiple optical paths, the splitter configured to receive as input output of the circulator, each optical path comprising:
    a respective reflector configured to reflect at least a portion of the periodic optical signal back toward the circulator as a respective reflected signal; and
    a respective phase shifter;
  a photodiode optically coupled to the circulator and configured to receive as input each respective reflected signal; and
  a controller conductively coupled to the photodiode and configured to adjust at least one respective phase shifter based on output of the photodiode such that the periodic optical signal is in phase at each termination of each optical path.

9. The self-calibrating reference signal distribution system of claim 8, wherein the signal source is an integrated signal source.

10. The self-calibrating reference signal distribution system of claim 8, wherein the signal source receives input from an electronic signal source external to the reference signal distribution system.

11. The self-calibrating reference signal distribution system of claim 8, wherein the splitter comprises at least one waveguide.

12. The self-calibrating reference signal distribution system of claim 8, wherein the splitter comprises at least one fiber optic coupling.

13. The self-calibrating reference signal distribution system of claim 8, wherein at least one respective reflector comprises a Bragg grating.

14. The self-calibrating reference signal distribution system of claim 8, wherein:
  the photodiode is a first photodiode; and
  the self-calibrating reference signal distribution system comprises:
    a respective second photodiode coupled to each respective termination of each respective optical path; and
    a respective band pass filter configured to receive as input and output of the respective second photodiode, each respective band pass filter configured to provide as output a respective local oscillator signal for a respective electronic circuit.

15. A method of operating a self-calibrating reference signal distribution system, the method comprising:
  providing a periodic optical signal as input to a circulator;
  receiving, by a splitter, output from the circulator, the splitter comprising a plurality of optical paths, each optical path of the plurality of optical paths comprising a reflector;
  receiving a reflection of the periodic optical signal resulting from operation of reflectors of the plurality of optical paths;
  determining phase errors from reflectors of the plurality of optical paths; and
  introducing, based on the phase errors, a phase delay within at least one of the plurality of optical paths such that portions of the periodic optical signal traversing the plurality of optical paths are in phase.

16. The method of claim 15, comprising generating the periodic optical signal by filtering an optical frequency comb.

17. The method of claim 15, comprising generating the periodic optical signal by combining two laser light sources with a combiner.

* * * * *